Jan. 3, 1933.   F. H. ROYCE   1,893,339
SHOCK DAMPING DEVICE
Filed May 24, 1930   2 Sheets-Sheet 1
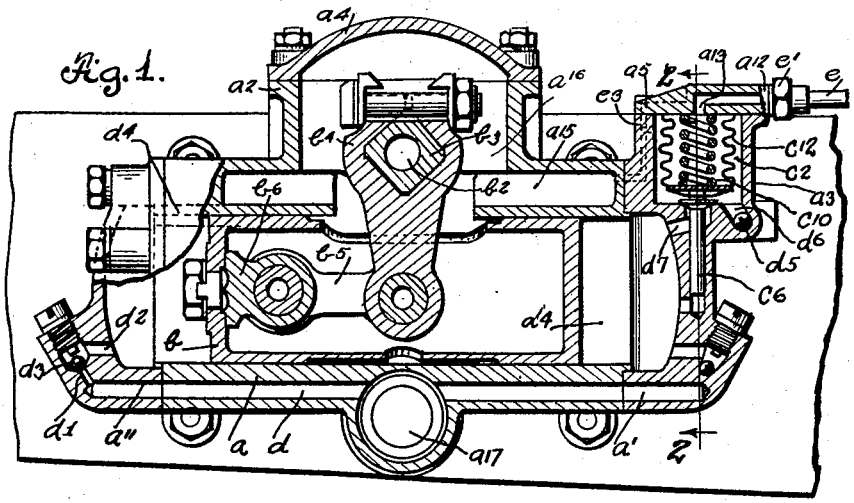

Jan. 3, 1933.  F. H. ROYCE  1,893,339
SHOCK DAMPING DEVICE
Filed May 24, 1930  2 Sheets-Sheet 2
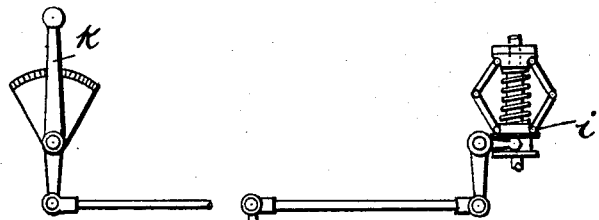
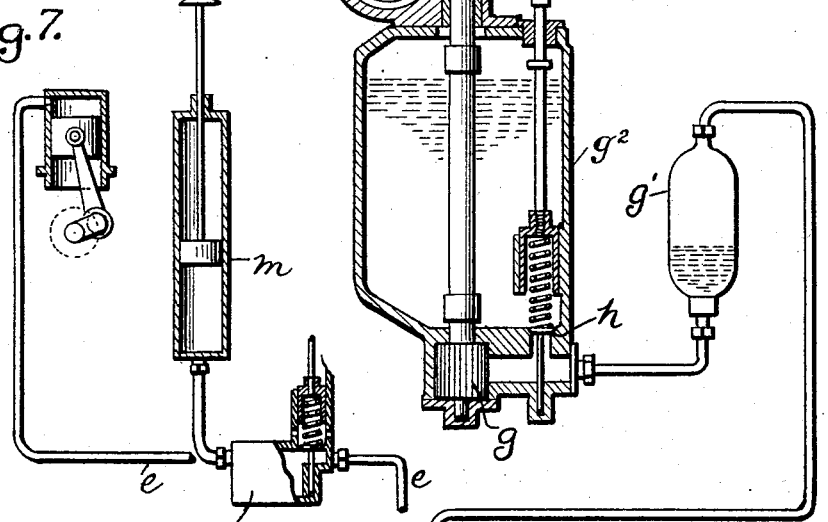
Fig. 7.  Fig. 8.  Fig. 6.
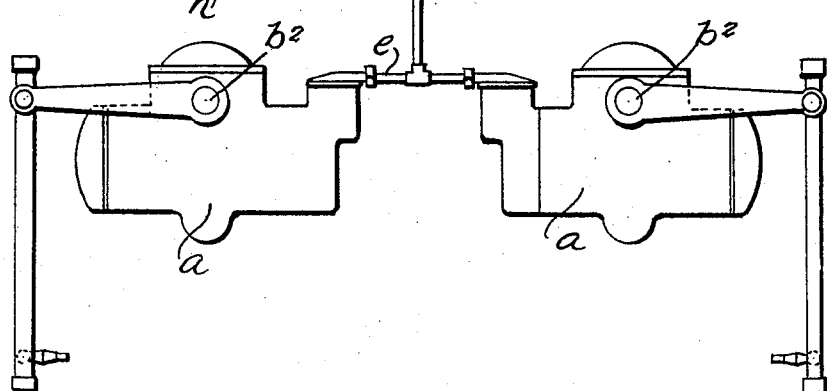
Inventor
Frederick Henry Royce
By Connolly Bro
Attorneys Patented Jan. 3, 1933

1,893,339

UNITED STATES PATENT OFFICE

FREDERICK HENRY ROYCE, OF ELMSTEAD, WEST WITTERING, NEAR CHICHESTER, ENGLAND, ASSIGNOR TO ROLLS ROYCE LIMITED, OF DERBY, ENGLAND

SHOCK DAMPING DEVICE

Application filed May 24, 1930, Serial No. 455,334, and in Great Britain May 29, 1929.

This invention has reference to shock dampers and is mainly useful where the conditions vary, as they do in the case of shock dampers fitted to motor cars, owing to variations in the quality of the road and/or in the speed of the car and/or the load carried.

A shock damper adjusted to function at its best efficiency under one set of conditions does not function to the same efficiency under other conditions.

Accordingly shock dampers have been made adjustable and in the case of hydraulic shock dampers where the release or escape is controlled by a valve opening against the reaction of a coiled metal spring, proposals have been made to adjust the tension of the spring by moving its seat.

This invention is an improved method of adjusting hydraulic shock dampers and consists of providing that one or more of the valves which control the release or escape shall open against the reaction of an air spring or air springs, in addition to, or in substitution for the usual coil spring, and providing means whereby the pressure of the air constituting such air spring can be increased or diminished.

In one form of this invention, the pathway of the oil or other liquid from the compression chamber of the shock damper is controlled by a one way mushroom valve. Such valve is loaded as follows. A coil spring is provided with one end seated on a metal plate seated against the head of the valve and the other on a part of the casing of the shock damper immediately above the head of the valve or other suitable seating. Such spring may be arranged to be of such strength as to give the minimum shock damping effect required. Around such spring is formed an airtight chamber consisting of a cylindrical box with corrugated sides so as to be expandible and compressible concertina fashion, one end being fixed and sealed by the said metal plate seated against the valve head, and the other fixed to and sealed by the casing of the shock damper around the seating of the spring remote from the valve or some other suitable base. An air pipe leads into such chamber at a point remote from the valve and gives access to the source of air. When the valve lifts from its seating it compresses both the coil spring and the air in the airtight chamber, and accordingly, as the pressure of the air in the latter is varied the resistance of the valve is increased or diminished. Such air pressure may be varied, by means of the said pipe.

A small by-pass may be provided whereby some portion of the oil in the compression chamber of the shock damper and any air which may collect therein may escape without passing through the valve.

In the accompanying drawings an example of this invention is diagrammatically illustrated. Figure 1 is a vertical section on the line 1—1 of Figure 5. Figure 2 is a cross section on the line 2—2 of Figure 1. Figure 3 is a vertical section on the line 3—3 of Figure 5. Figure 4 is a sectional plan view of Figure 2 on the line 4—4 of Figure 2 and Figure 5 is a general plan view.

Figs. 6, 7, 8 illustrate in section means for compressing the air.

$a$ is a main part of the apparatus, $a^1$ and $a^{11}$ are end parts spigotted to the main part $a$ and secured thereto by studs and nuts. The main part $a$ has an upstanding part $a^2$ and the end part $a^1$ an upstanding part $a^3$. $a^4$ is a cover secured to the upstanding part $a^2$ by studs and nuts. $a^5$ is a cover over the part $a^3$ secured thereto by screws $a^6$ and having a T shaped upstanding part $a^7$ on top thereof with two communicating conduits at right angles to each other $a^8$ and $a^9$ formed therein, a web $a^{10}$ and a union $a^{12}$ formed on the end of the conduit $a^8$ to receive the pipe hereinafter described. The ends of the conduits $a^9$ communicate by vertical holes $a^{13}$ to the inside of the cover. The part $a$ with the end parts $a^1$ and $a^{11}$ comprises a cylindrical chamber $a^{14}$, an elongated chamber $a^{15}$ and a reservoir or tank $a^{16}$ extending down the side of the cylindrical chamber and merging into a circular part $a^{17}$ underneath the cylindrical chamber, the elongated chamber $a^{15}$ opens into the reservoir $a^{16}$. Oil is admitted to the apparatus through the opening $a^{18}$. $b$ is a double ended hollow piston slideable in the cylindrical chamber $a^{14}$ actuated by the lever $b^1$ through the shaft $b^2$ which has a square part $b^3$, the lever $b^4$ clamped on such square part and a pair of links $b^5$ pivotally hinged at one end to the free end of the said lever and at the other end to a lug $b^6$ secured to the piston. Means not shown operatively connect the "shocked" member to be restrained to the lever $b^1$.

The upper part of the casting of the end part $a^1$ is hollow with a central dividing flange $c$ thus forming two chambers $c^2$ and $c^3$. From the bottom of each of such chambers are drilled two two-diameter holes $c^4$ and $c^5$. In each of these is a mushroom valve $c^6$ and $c^7$ seating on chamfers formed on the top of the larger diameter portion of the holes $c^4$ and $c^5$ with stems fitting and sliding in the smaller diameter part of such holes. $c^8$ and $c^9$ are metal plates held down on the head of the valves $c^6$ and $c^7$ by two springs $c^{10}$ and $c^{11}$ reacting at one end on such plate and at the other end on the cover plate $a^5$. $c^{12}$ and $c^{13}$ are two cylinders with corrugated sides sealed at one end by the said metal plates $c^8$ and $c^9$ and at the other by the cover plate $a^5$. $d$ is a conduit drilled through the main part of the main casting $a$ and into the end parts $a^1$ and $a^{11}$ connected with the circular part $a^{17}$ of the reservoir and with each end of the chamber $a^{14}$ via conduits $d^1$ and $d^2$; $d^3$ are one-way ball valves admitting liquid into the ends of the chamber $a^{14}$ and $d^4$ is a conduit drilled through the main part $a$ and into the end parts $a^1$ and $a^{11}$ opening at one end into the end of the chamber $a^{14}$ at the left side of the piston and at the other end into a conduit $d^5$ which is connected via the conduit $d^6$ to the space $c^2$ above the mushroom valve $c^6$ and also connected directly to the hole $c^5$ below the head of the mushroom valve $c^7$. $e$ is a pipe connected by a nut $e^1$ to the union $a^{12}$ at one end and at the other end to a source of pressure. $e^3$ are drilled holes connecting the chambers $c^2$ and $c^3$ with the elongated chamber $a^{15}$ to provide air leaks.

The functioning of the apparatus above described is as follows:—In the event of the piston being moved to the left liquid will be forced via the conduits $d^4$, $d^5$ and $d^9$, the mushroom valve $c^7$ and the conduit $d^8$ into the other end of the chamber $a^{14}$. If the piston is moved to the right liquid will be forced via the conduit $d^7$, the mushroom valve $c^6$, conduits $d^6$, $d^5$ and $d^4$ to the other end of the chamber $a^{14}$. In each case the passage of oil will be resisted by one or other of the springs $c^{10}$ or $c^{11}$ and the air in one or other of the vessels $c^{12}$ and $c^{13}$. By means of the pipe $e$ giving access to the interior of the said vessels by the conduits $a^8$, $a^9$ and $a^{13}$ the pressure of air in such vessels may be varied and the resistance of the valves increased or diminished.

The compression of the air may be by means of a pump worked by the driver or driven by the engine or the transmission or other moving part, and means can be provided by which the driver can alter such pressure at will, or the alteration can be controlled by a centrifugal governor or by any other moving part.

Oil or any other form of liquid transmission and distribution may be employed for compressing the air in conjunction with a suitable air vessel or vessels. For example, the variable compression may be produced by a supply of air or oil or other fluid under pressure produced by a pump provided with a relief valve or relief port in manner well known, the spring of which relief valve or area of which relief port is variable and controlled either by a hand operated device or an automatic device which latter may be a centrifugal device driven by the engine or transmission or other moving part.

Referring to Figs. 6, 7, and 8, the reservoir $g^2$, Fig. 6, is filled with oil which is pumped by a gear pump $g$, into an air chamber $g'$, the relief valve $h$ being controlled either by the governor $i$ or lever $k$. In an alternative arrangement shown in Fig. 7 a hand pump $m$ is utilized to pump air into a reservoir $n$, the relief valve of which may be controlled either by hand or by a centrifugal governor.

In another arrangement shown in Fig. 8, a mechanically driven pump $j$, may be used instead of a hand pump. None of the devices illustrated in Figs. 6, 7, 8, or described with reference thereto constitute parts of the invention covered by the claims.

What I claim is:—

1. A hydraulic shock damper comprising a cylinder, a member reciprocating therein adapted to form therewith a compression chamber, a release for the escape of liquid from the compression chamber, a spring loaded valve controlling such release and a compressible air tight chamber forming an air spring and means for varying the pressure of the air therein.

2. A hydraulic shock damper for a mechanically propelled vehicle comprising a cylinder, a member reciprocating therein adapted to form therewith a compression chamber, a release for the escape of liquid from the compression chamber, and a spring loaded valve controlling such release, a compressible air tight chamber forming an air spring, and automatic means for varying the pressure of the air consistently with the speed of the road vehicle.

3. A hydraulic shock damper for a road vehicle propelled by the engine comprising a cylinder, a member reciprocating therein adapted to form therewith a compression chamber, a release for the escape of liquid from the compression chamber, and a spring loaded valve controlling such release, an air spring loading said valve and automatic means for varying the pressure of the air consistently with the speed of the engine of the road vehicle.

4. A hydraulic shock damper comprising a cylinder, a member reciprocating therein adapted to form therewith, a compression chamber, a release for the escape of liquid from the compression chamber, a spring and air loaded valve controlling such release and means for varying the pressure of the air at will operable by the driver.

5. A hydraulic shock damper comprising a cylinder, a member reciprocating therein adapted to form therewith a compression chamber, a release for the escape of liquid from the compression chamber, a mushroom valve controlling such release loaded by a spring consisting of a cylindrical metal box with corrugated expandable sides, one end abutting against the head of the valve and the other fixed relatively to the cylinder and means for varying the pressure of the air in the box.

6. A hydraulic shock damper as claimed in claim 5, a coil spring being contained in the said metal box reacting between the ends thereof.

In testimony whereof I have hereunto affixed my signature.

FREDERICK HENRY ROYCE.